Dec. 1, 1953  J. C. HORN ET AL  2,661,108
TRANSPORT TRAILER
Filed Dec. 7, 1950  2 Sheets-Sheet 1

Inventors
John C. Horn
Rufus W. Wilson
By Estabrook & Estabrook Attorneys

Dec. 1, 1953
J. C. HORN ET AL
2,661,108
TRANSPORT TRAILER
Filed Dec. 7, 1950
2 Sheets-Sheet 2
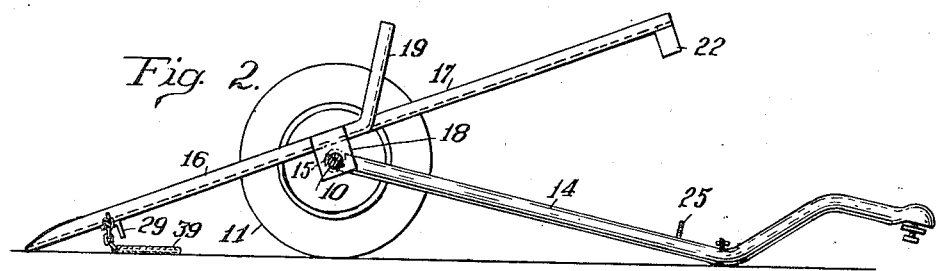
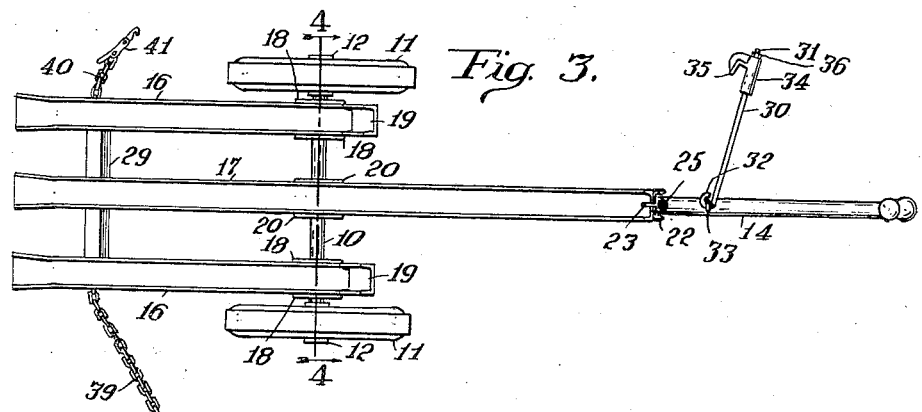
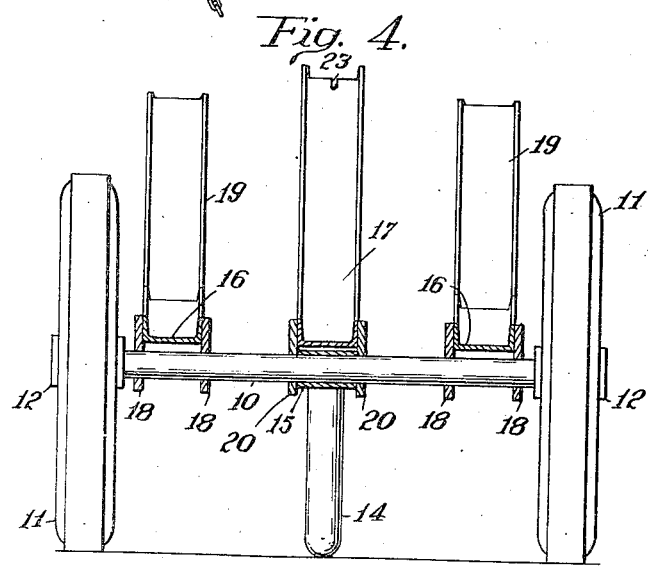
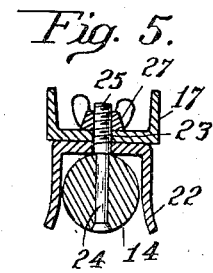
Inventors
John C. Horn
Rufus W. Wilson
Estabrook & Estabrook, Attorneys Patented Dec. 1, 1953

2,661,108

UNITED STATES PATENT OFFICE 2,661,108

TRANSPORT TRAILER

John C. Horn, Alexandria, and Rufus W. Wilson, Huntingdon, Pa., assignors to Wald Industries, Inc., Huntingdon, Pa., a corporation of Pennsylvania Application December 7, 1950, Serial No. 199,634

6 Claims. (Cl. 214—506)

This invention relates broadly to trailers and more specifically to trailers of the two wheel type embodying a pivotally mounted bed or platform.

In relatively small hand steered motor driven vehicles one of the most aggravating problems found in present day usage of such machines is the transporting or moving of these machines from one job site to another. While these machines are motor driven they are not designed to be moved, under their own power, over a great distance. In addition the type of motor usually employed on such machines is of a small horsepower type with a gear ratio that is not conducive to traveling from place to place at a high rate of speed. This is particularly true with respect to small three wheeled vehicles, such as, road striping or marking machines, tractors, mowers and the like.

The present day practice of moving such machines from one job site to another or for transporting said machines over a great distance, is to employ a truck or trailer. One of the difficulties encountered, however, in utilizing such a mode of transportation is in the loading and unloading of the machines, which machines usually weigh several hundred pounds. It has been customary to either manually lift these machines onto the truck or trailer or to construct a ramp of some type whereby the machine could be pushed onto the bed of the trailer or truck. Such a procedure is not only time consuming but also susceptible of causing injury to the persons loading or unloading the machine and possible damage to the machine.

The present invention is directed to a trailer for use in conjunction with machines of the aforementioned type and is designed to overcome the difficulties and shortcomings found in prior art structures.

One of the objects of the present invention is to provide a two wheeled trailer having a pivotally mounted bed or platform for loading a wheeled vehicle thereon.

Another object is to provide a trailer having a locking means for securing the pivotally mounted platform to the trailer.

Another object is to provide a trailer embodying a pivotally mounted platform with a locking means for securely anchoring a wheeled vehicle on the platform.

A further object is to provide the pivotal platform of the trailer with trackways for guiding a wheeled vehicle onto the trailer.

A still further object is to provide a two wheeled trailer having a pivotally mounted platform for supporting a wheeled vehicle with means for positioning the wheeled vehicle on the platform and causing the platform to move from an inclined to a horizontal position.

Further objects are to provide a trailer which is light in weight, can be economically manufactured and which will be reliable and efficient in service.

Other objects and advantages more or less ancillary to the foregoing and the manner in which all of the various objects are realized will appear in the following description, which considered in connection with the accompanying drawings, sets forth the preferred embodiment of the invention.

Referring to the drawings wherein the preferred embodiment of the invention is illustrated:

Figure 2 is a side elevational view of the trailer with the platform or bed disposed in an inclined position; one of the trailer wheels has been omitted in the interest of clarity;

Figure 3 is a plan view of the trailer with the platform secured in a horizontal position on the trailer;

Figure 4 is a vertical sectional view taken on line 4—4 of Figure 3 and showing the mounting of the platform on the trailer, and Figure 5 is a vertical sectional view taken on line 5—5 of Figure 1 showing the locking means for securing the platform to the trailer.

Figure 1:
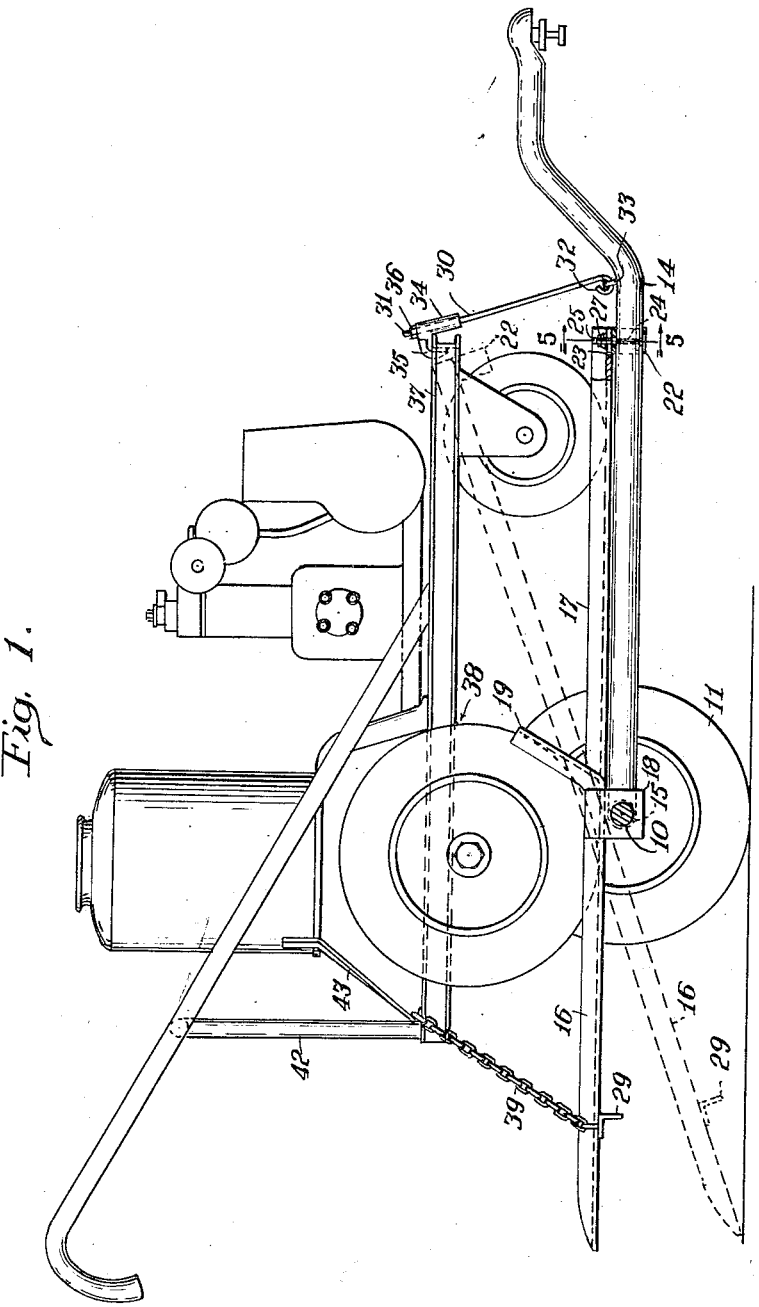
Figure 1 is a side elevational view of the trailer showing a self propelled hand steered wheeled vehicle mounted on the platform or bed of the trailer.

Referring to the drawings there is shown a trailer embodying an axle 10, Figure 4, with a wheel 11 mounted on each end thereof. The wheels 11 are provided with conventional pneumatic tires to facilitate the moving of the trailer over conventional roadways at relatively high speeds. The wheels 11 are mounted on suitable bearings on the ends of the axle and the bearings and wheels are secured by means of castillated nuts 12, which nuts are in turn retained on the end of the axle by cotter keys or pins so that the wheels have a free rotative movement with respect to the axle.

A draw bar or tongue 14 formed of a tubular conduit or pipe has a sleeve or collar 15 secured to one end thereof and disposed in a plane at right angles to the longitudinal axis of the tongue. The collar 15 may be secured to the end of the tongue 14 by any suitable means such as welding. The collar 15 is mounted on the axle 10 intermediate the wheels 11 with the tongue 14 extending outwardly from the axle and denoting the front end or forward side of the trailer. The tongue 14 has a free pivotal movement with respect to the axle 10 so that the tongue 14 may be moved from the inclined position of Figure 2 to the elevated or horizontal position of Figure 1 to facilitate the attachment of the trailer to a motor vehicle. The forward or free end of the tongue 14 is provided with a trailer ball and hitch socket, of any well known type, to facilitate the attaching of the trailer to a towing vehicle.

A trailer platform or bed is pivotally mounted on the axle 10 and consists of outer channel shaped trackways or guideways 16 and an inner channel shaped trackway or guideway 17. The flanges or sides defining the trackways 16 have depending brackets 18 welded or riveted thereto adjacent an end of said trackways. The lower or free ends of the brackets 18 are formed with aligned apertures through which the axle 10 is adapted to extend. The apertures formed in the ends of the brackets 18 are reamed to the same size as the axle 10 so as to provide a tight fit between the brackets and axle. Thus, the trackways 16, constituting a part of the trailer bed or platform, have an end that is mounted on the axle 10 and which has a pivotal movement in conjunction with the axle due to the wheels 11 being mounted on bearings on the ends of the axle. The trackways 16 are adapted to project slightly beyond the axle 10, in the same direction as the tongue 14 and the ends of said trackways terminate in upwardly extending stops or bumper plates 19. The stop or bumper plates 19 are of a channel configuration complimentary to the trackways 16 and may be formed integrally with the trackways or they may be formed as separate parts that are secured, by welding, riveting, or the like, to the ends of the trackways.

The center or middle trackway 17, while being of a greater length than trackways 16, is of the same configuration as the trackways 16 and is mounted on the axle 10 by depending brackets 20 in the same manner as trackways 16. Thus, with the wheels 11 mounted on bearings on the ends of the axle 10, the axle has a free rotative movement with respect to the wheels. In as much as the trackways 16 and 17 are secured to the axle 10 by brackets 18 and 20 the trackways and axle move as a unit with respect to the wheels. The collar 15 of the tongue 14 is mounted on the axle 10 between the depending brackets 20 of the middle trackway 17, thus the collar 15 is centered on the axle 10 and prevented from moving lengthwise of the axle by the brackets 20 which have a tight wedge like fit on the axle. The brackets 20 are secured to the trackway 16 approximately midway of its ends and the trackway 16 is so positioned on the axle 10 that a portion thereof extends forwardly of the trailer axle in aligned relation with the tongue 14, Figures 2 and 3. The forward end of the center trackway 16 is provided with a pair of depending flanges or guides 22 with the free ends of the flanges being flared outwardly as shown in Figure 5. The flanges 22 are adapted to engage the tongue or shaft 14 when the trailer platform is pivoted so as to guide the inner trackway 17 into engagement with the tongue 14 in the manner as shown in Figure 1. The forward end of the channel shaped trackway 17 intermediate the depending guides 22 is provided with a slot or aperture 23, Figure 3, through which a locking or anchoring member on the tongue 14 is adapted to project for securing the trackway 17 to the tongue.

The shaft 14 is provided intermediate its ends with an aperture through which a bolt 24 is inserted, Figure 5, with the threaded end 25 of the bolt projecting above the top surface of the shaft. The bolt 24 is securely anchored within the shaft 14 by any suitable means, such as welding, with the threaded end 25 arranged to extend through the slot 23 in the trackway 17 when the trailer platform is moved from an inclined to a horizontal position. Thus when the trackways 16 and 17 constituting the trailer platform or bed, are pivoted with respect to the wheels 11 the center trackway 17 will be disposed upon the shaft 14 with the threaded end portion 25 of the bolt 24 extending through the aperture 23 in the trackway. With the parts so arranged a wing nut 27 is threaded upon the bolt 24 for securely anchoring the center trackway 17 to the shaft 14.

The rear end portion of the trackways 16 and 17 have secured to their lower or bottom surfaces a transversely extending tie rod or brace member 29 which brace member may be affixed to said trackways by welding, riveting or any other suitable means. Through the medium of the transverse tie rod or brace member 29 the trackways 16 and 17 constitute an integral structure and define the trailer platform or bed which is affixed to the axle 10 by means of the depending brackets 18 and 20 secured to the trackways 16 and 17, respectively. As pointed out heretofore the depending brackets 18 and 20 are provided with aligned apertures of the same diameter as the diameter of the axle 10 so that the trailer platform or bed is assured of a pivotal movement in the wheel bearings. Furthermore the stops 19 on the ends of trackways 16 are positioned slightly forward of the axle 10 and when taken in conjunction with the forwardly extending portion of trackway 17 the trailer platform will pivot in the wheel bearings about the wheels 11 from an inclined position of Figure 2 to an elevated position of Figure 1 when a wheeled vehicle is moved onto the trailer platform and engages the stops 19 as shown in Figure 1. That is, with the trailer in the position as shown in Figure 2, the weight of a three wheeled vehicle moving onto the trailer will cause the trailer platform and axle to pivot on the wheel bearings. This pivotal movement will occur as the front wheel of the vehicle moves over trackway 17 and out along the forward portion of this trackway and as the rear wheels of the vehicle move over trackways 16 and engages the stops 19. Thus the trailer platform in a loaded condition will be pivoted in the wheel bearings to the position shown in Figure 1. An anchor or hold down clamp is secured to the shaft 14 intermediate the forward end of the shaft 14 and the bolt 24. The hold down clamp consists of a rod 30 having a threaded end portion 31 with an eye hook 32 formed on the other end. An arcuate shaped fitting 33 is inserted through the eye 32 and the free ends of the fitting 33 are secured to the shaft 14 by any suitable means such as welding, so that the rod 30 has a free pivotal movement. The body or hook portion of the hold down clamp comprises a body member 34 having a hooked arm 35 formed integrally and projecting therefrom. The body member 34 is drilled, or cored throughout its length so that the body member may be slipped over the rod 30. A nut and washer combination 36 is threaded upon the end 31 of the rod 30 for retaining the body and hook member 35 on the rod 30. The hooked arm 35 of the clamp is adapted to engage the forward frame portion 37 of a wheeled vehicle 38, Figure 1, when it is mounted upon the trailer platform or bed. The body member 34 and hook arm 35 are mounted on the rod 30 and then the clamp is swung into position so that the hook arm 35 engages the frame 37 and then the nut 36 is threaded upon the rod 30 for securely anchoring the wheeled vehicle to the bed of the trailer.

The trailer platform is provided adjacent the rear end portion thereof with anchoring or hold down chains 39 and 40. The chain 39 has one end secured to the side of one of the trackways 16 by any suitable means such as welding while the chain 40, which is shorter than chain 39 has one end secured to the side of the other trackway 16 by welding or any other suitable means. The free end of the chain 40 is provided with a hame hitch or a toggle clamp 41 that is adapted to engage the free end of chain 39 after chain 39 has been passed from one side of the wheeled vehicle 38 to the other side. In passing chain 39 from one side to the other of the wheeled vehicle it is passed through the vehicle forward of the vertical supports 42 and 43 of the wheeled vehicle 38 and the hame hitch or toggle clamp 41 is then inserted through one of the links in chain 39 and locked thus securely anchoring the rear end portion of the wheeled vehicle 38 on the trailer bed or platform.

In the use of the trailer constituting the subject matter of the present invention the trailer platform or bed may be loaded with a wheeled vehicle whether or not the trailer shaft 14 is secured to the rear end of a towing vehicle. In other words it is not necessary to secure the shaft 14 to the towing vehicle prior to the loading of a wheeled vehicle upon the platform of the trailer. This is due to the fact that the shaft 14 which is connected to the axle 10 is adapted to have a free pivotal movement with respect to the axle 10. Thus with a wheeled vehicle supported on the trailer platform and the center trackway 16 secured to the shaft or tongue 14 the tongue may be either lifted manually for attaching the trailer to a towing vehicle or a downward pressure may be applied manually to the rear portion of the vehicle on the platform for pivoting the platform and tongue 14 and thus raise the forward end of the tongue for securing the trailer to a towing vehicle.

In loading or placing a wheeled vehicle upon the trailer the trackways 16 and 17 constituting the pivotally mounted bed of the trailer are arranged in an inclined position such as shown in Figure 2. With the trailer so disposed a self propelled wheeled vehicle of a three wheeled type, such as a tractor or road striping machine or the like, may be moved up the trackways 16 and 17 manually or under its own motive power, with the forward wheel of the three wheeled vehicle moving up the inner trackway 17 and the outer or rear wheels of the three wheeled vehicle engaging the outer trackways 16. As the wheeled vehicle moves up the trackways the rear wheels of the vehicle will engage the inclined stops 19 on the trackways 16 and prevent further forward movement of the wheeled vehicle along the trackways. At the instant of engagement of the wheels of the wheeled vehicle with the inclined stop or bumper plates 19 the weight of the three wheeled vehicle is so disposed on the trackways 16 and 17 as to cause the trackways and axle 10 to pivot or seesaw with respect to the wheels 11 so that the platform or bed of the trailer with the wheeled vehicle thereon moves into an elevated position. As the bed of the trailer assumes an elevated or horizontal position the depending flanges 22 of the trackway 17 guide the trackway 17 onto the shaft 14 so that the threaded end 25 of the bolt 24 projects through the apertures 23 provided in the base of trackway 17. With the bolt 24 extending through the trackway 17 the wing nut 27 is secured to the threaded end 25 of the bolt 24 for securely anchoring the trackway 17 and the tiltable platform of the trailer in a horizontal or elevated position. With the three wheeled vehicle disposed upon the bed of the trailer and the rear wheels of the wheeled vehicle engaging the stops 19 the hook 35 of the anchoring or hold down clamp is secured to the frame 37 of the wheeled vehicle 38 and the nut 36 is then tightened down on the rod 30 for securely anchoring the wheeled vehicle 38 on the trailer platform. After the hold down clamp is secured to the forward end 37 of the vehicle 38 the rear anchoring chain 39 is passed through the vehicle 38 forward of the vertical supports 42 and 43 and the free end portion of the chain 39 is secured by the hame hitch or toggle clamp 41 on the chain 40 to insure the retention of the vehicle on the trailer platform. With the trailer loaded in the manner as described the forward end of the shaft or tongue 14 may be secured to a towing vehicle by any suitable trailer hitch so that the trailer and the wheeled vehicle disposed on the trailer platform may be moved from one location to another.

In unloading the trailer the forward and rear anchoring means are removed from the vehicle 38 and the wing nut 27 is removed from the bolt 24 so that the wheeled vehicle either by manual means or under its own motive power may be moved backwardly along the trackways 16 and 17. As the rear wheels of the wheeled vehicle pass beyond the axle 10 of the trailer the platform and axle will start to pivot and the platform will gradually assume an inclined position such as shown in Figure 2 as the wheeled vehicle is backed down the trackways 16 and 17.

We claim:

1. A trailer comprising an axle having a pair of wheels rotatably mounted thereon, a forwardly extending tongue connected to said axle, a rearwardly extending platform mounted on said axle for supporting a three wheeled vehicle comprising an inner and a pair of outer trackways, said outer trackways having an end connected to said axle, said inner trackway connected at a point intermediate its ends to said axle, said platform having a pivotal movement with respect to said wheels, stop members provided on said end of the outer trackways and arranged to project slightly forward of said axle and means on said tongue engageable with the wheeled vehicle for retaining the wheels of said vehicle in engagement with said stop members.

2. A trailer comprising an axle having a pair of wheels rotatably mounted thereon, a forwardly extending tongue connected to said axle, a platform for a three wheeled vehicle comprising an inner and a pair of outer trackways, said outer trackways having an end connected to said axle, said inner trackway secured at a point intermediate its ends to said axle, said platform having a pivotal movement with respect to said wheels, a portion of said inner trackway extending beyond the forward ends of said outer trackways and arranged in aligned relation with said tongue and means on said tongue engageable with said portion of said inner trackway for securing said platform to said tongue.

3. A trailer comprising an axle having a pair of wheels rotatably mounted thereon, a forwardly extending tongue connected to said axle, a platform comprising an inner and a pair of outer trackways, said outer trackways having depending flanges adjacent an end thereof affixed to said axle, said inner trackway having depending flanges intermediate its ends affixed to said axle, said platform and axle having a free pivotal movement as a unit with respect to said wheels, a portion of said inner trackway extending beyond the forward ends of said outer trackways and arranged in aligned relation with said tongue, guide means on the end of said inner trackway engageable with said tongue for maintaining said inner trackway in aligned relation with said tongue when said platform is in an elevated position and means on said tongue engageable with said inner trackway for maintaining said platform in an elevated position.

4. A trailer comprising an axle having a pair of wheels rotatably mounted thereon, a forwardly extending tongue pivotally mounted on said axle, a rearwardly extending platform mounted on said axle and adapted to have a pivotal movement with respect to said wheels, said platform comprising an inner and a pair of outer trackways, said outer trackways having an end thereof affixed to said axle, said inner trackway mounted at a point intermediate its ends on said axle, a portion of said inner trackway extending beyond the forward ends of said outer trackways and arranged in aligned relation with said tongue, means on said tongue engageable with said portion of said inner trackway for maintaining said platform in an elevated position, and a tie bar secured to the free ends of said trackways for maintaining said trackways in spaced relation on said axle.

5. A trailer comprising an axle having a pair of wheels rotatably mounted thereon, a forwardly extending tongue connected to said axle, a rearwardly extending platform affixed to said axle, said platform comprising an inner and a pair of outer trackways for supporting a three wheeled vehicle with the rear wheels of said vehicle being disposed in said outer trackways, said outer trackways terminating at one end adjacent said axle, said inner trackway projecting forwardly beyond said outer trackways and arranged in aligned relation with said tongue, said inner trackway arranged to support the forward wheel of said three wheeled vehicle, a tie rod extending transversely of said trackways and secured to the rear end portions of said trackways, locking means on said tongue engageable with the forward end of said inner trackway for maintaining said platform in an elevated position, stops provided on the forward ends of said outer trackways engageable by the wheels of said wheeled vehicle for positioning said wheeled vehicle in said outer trackways and anchoring means on said tongue engageable with the wheeled vehicle on said trackways for retaining the wheels of said wheeled vehicle in engagement with the stops on said outer trackways.

6. A trailer comprising an axle having a pair of wheels rotatably mounted thereon, a platform comprising an inner trackway and a pair of outer trackways, said outer trackways provided adjacent their forward ends with depending flanges affixed to said axle, said inner trackway having depending flanges intermediate its ends affixed to said axle, said platform and axle having a pivotal movement with respect to said wheels, a forwardly extending tongue connected to said axle intermediate the depending flanges of said inner trackway, a tie rod secured to the rear ends of said outer and inner trackways, said outer trackways having inclined stop members formed on the forward end portions and arranged to project slightly forward of said axle, said inner trackway having a portion extending forwardly of said axle and arranged in aligned relation with said tongue, said platform being disposed in an inclined plane when in an unloaded condition, said trackways adapted to pivot with said axle upon the moving of a three wheeled vehicle upon said platform, with the outer wheels of said wheeled vehicle arranged to engage the inclined stop members on said outer trackways for pivoting said platform and axle and moving the forward portion of said inner trackway into engagement with said tongue, and locking means on said tongue engageable with said inner trackway for securing said trackway to said tongue.

JOHN C. HORN.
RUFUS W. WILSON.

References Cited in the file of this patent
UNITED STATES PATENTS

| Number | Name | Date |
|---|---|---|
| 745,545 | Davis | Mar. 15, 1904 |
| 1,777,422 | Winn | Oct. 7, 1930 |
| 1,812,097 | Judd | June 30, 1931 |
| 2,248,080 | Hathaway | July 8, 1941 |
| 2,318,802 | Reid | May 11, 1943 |
| 2,323,817 | Lee | July 6, 1943 |
| 2,505,421 | McMurtrie | Apr. 25, 1950 |

FOREIGN PATENTS

| Number | Country | Date |
|---|---|---|
| 239,774 | Great Britain | Sept. 17, 1925 |